United States Patent
Wang et al.

(10) Patent No.: US 8,928,199 B2
(45) Date of Patent: Jan. 6, 2015

(54) WOUND ROTOR BRUSHLESS DOUBLY-FED MOTOR

(75) Inventors: Xuefan Wang, Wuhan (CN); Dixian Shu, Wuhan (CN)

(73) Assignees: Huazhong University of Science and Technology, Wuhan (CN); China Changjiang National Shipping Group Motor Factory, Wuhan (CN)

( * ) Notice: Subject to any disclaimer, the term of this patent is extended or adjusted under 35 U.S.C. 154(b) by 0 days.

(21) Appl. No.: 13/178,542

(22) Filed: Jul. 8, 2011

(65) Prior Publication Data

US 2012/0007461 A1 Jan. 12, 2012

Related U.S. Application Data

(63) Continuation of application No. PCT/CN2009/072293, filed on Jun. 16, 2009.

(30) Foreign Application Priority Data

Mar. 27, 2009 (CN) .......................... 2009 1 0061297

(51) Int. Cl.
*H02K 3/00* (2006.01)
*H02K 3/28* (2006.01)
*H02K 17/16* (2006.01)

(52) U.S. Cl.
CPC ................ *H02K 17/165* (2013.01); *H02K 3/28* (2013.01)
USPC .......................................... 310/198; 310/195

(58) Field of Classification Search
CPC .............................. H02K 19/12; H02K 19/14
USPC ......... 310/178, 180, 179, 166, 171, 173, 211, 310/212, 184, 185, 195, 197
IPC ...................................................... H02K 19/26
See application file for complete search history.

(56) References Cited

U.S. PATENT DOCUMENTS 3,594,595 A * 7/1971 Williams et al. ............... 310/168
3,600,619 A * 8/1971 Tiarks ........................... 310/180

(Continued)

FOREIGN PATENT DOCUMENTS

CN 1378326 A * 11/2002
CN 1972087 A * 5/2007

(Continued)

OTHER PUBLICATIONS

Chinese Machine Translation, CN 1378326 A, AC brushless double feed motor, Apr. 18, 2012, http://cs.dialog.com/client/csc_sh127/.*

(Continued)

*Primary Examiner* — Tran Nguyen
*Assistant Examiner* — Thomas Truong
(74) *Attorney, Agent, or Firm* — Matthias Scholl P.C.; Matthias Scholl

(57) ABSTRACT

A wound rotor brushless doubly-fed motor includes a stator and a rotor. The stator includes two sets of three-phase windings and the number of pole pairs is $p_1$ and $p_2$ respectively. The rotor includes a multi-phase wound winding and phase number m is satisfied with the relation $m=(p_1+p_2)/m_k$, in which, when $p_1+p_2$ is odd, $m_k=1$; when $p_1+p_2$ is even, $m_k=2$. Rotor slots are evenly distributed along the circumference of the air gap and the number of the rotor slots Z' is satisfied with the relation $Z'=n(p_1+p_2)$, in which n is a positive integer. Rotor winding coils are multi-turn structure, coil number of each phase winding is $nm_k$ and each coil has the same span, but turn ratios among the coils are different. When the phase winding coils number $\leq nm_k$, all coils within the phase winding are automatically connected in short after being connected in series. The advantage of this invention is that the winding coil span can be changed flexibly and number of turns of each coil may be different so as to weaken high-order harmonics to the maximum extent.

8 Claims, 4 Drawing Sheets

(56) References Cited

U.S. PATENT DOCUMENTS

| | | | |
|---|---|---|---|
| 4,100,444 A * | 7/1978 | Boyd, Jr. | 310/184 |
| 4,736,147 A * | 4/1988 | Shizhang | 318/778 |
| 4,761,602 A * | 8/1988 | Leibovich | 318/816 |
| 5,359,272 A * | 10/1994 | Liao | 318/732 |
| 5,449,962 A * | 9/1995 | Shichijyo et al. | 310/184 |
| 5,747,909 A * | 5/1998 | Syverson et al. | 310/156.56 |

FOREIGN PATENT DOCUMENTS

| | | | |
|---|---|---|---|
| CN | 101039057 A | * | 9/2007 |
| JP | 01129739 A | * | 5/1989 |

OTHER PUBLICATIONS

Chinese Machine Translation, CN 1972087 A, High-power double-drive dual-feed brushless wind generator, Apr. 18, 2012, http://cs.dialog.com/client/csc_sh127/.*

Chinese Machine Translation, CN 101039057 A, A. C. brushless double-fed motor, Apr. 18, 2012, http://cs.dialog.com/client/csc_sh127/.*

USPTO Partial Translation, CN 101039057A, A. C. brushless double-fed motor, Mar. 28, 2007.*

* cited by examiner $$\begin{bmatrix} 1^4 & -2^7 & -3^9 & -4^{11} & -5^9 & -6^7 & -7^4 \end{bmatrix} \begin{bmatrix} 10^4 & -11^7 & -12^9 & -13^{11} & -14^9 & -15^7 & -16^4 \end{bmatrix} \begin{bmatrix} 19^4 & -20^7 & -21^9 & -22^{11} & -23^9 & -24^7 & -25^4 \end{bmatrix}$$

$$\begin{bmatrix} 28^4 & -29^7 & -30^9 & -31^{11} & -32^9 & -33^7 & -34^4 \end{bmatrix} \begin{bmatrix} 37^4 & -38^7 & -39^9 & -40^{11} & -41^9 & -42^7 & -43^4 \end{bmatrix} \begin{bmatrix} 46^4 & -47^7 & -48^9 & -49^{11} & -50^9 & -51^7 & -52^4 \end{bmatrix}$$

WOUND ROTOR BRUSHLESS DOUBLY-FED MOTOR

CROSS-REFERENCE TO RELATED APPLICATIONS

This application is a continuation of International Patent Application No. PCT/CN2009/072293 with an international filing date of Jun. 16, 2009, designating the United States, now pending, and further claims priority benefits to Chinese Patent Application No. 200910061297.1 filed Mar. 27, 2009. The contents of all of the aforementioned applications, including any intervening amendments thereto, are incorporated herein by reference.

BACKGROUND OF THE INVENTION

1. Field of the Invention

The invention relates to an AC brushless doubly-fed motor designed in accordance with slot harmonic magnetomotive force (MMF) of rotor windings. It belongs to the field of motor technology.

2. Description of the Related Art

AC brushless doubly-fed motors are applicable to frequency-conversion speed regulation systems, with reliable operation and low capacity of frequency converter. The motor stators are normally equipped with two sets of windings with pole pair number of $p_1$ and $p_2$, respectively. When the stator winding $p_1$ connects to a power grid power supply, a rotating magnetic field is created with pole pair number of $p_1$ Except $p_1$ pairs of pole magnetic fields, $p_2$ pairs of pole magnetic fields are also created by induced current in the rotor. In terms of the rotor, these two types of magnetic fields rotate in an opposite direction. If a variable-frequency power supply (VFPS) is connected with the stator winding $p_2$, the rotational speed of the motor can be changed by means of changing the frequency of the VFPS.

Rotor plays a crucial role in brushless doubly-fed variable-frequency speed regulation motors. Conventional rotors mainly include reluctance rotors and cage rotors. Since the iron core of the reluctance rotor must be made into a salient structure and the windings of the cage rotor must be made into a concentric type short-circuited winding, the two rotors can only be used with specific number of poles. In addition, compare with conventional AC motor rotors, the above two rotors have a relatively larger volume and poor performance index.

AC brushless doubly-fed motors can also be used as electric generators, and for either wind or hydraulic power generation, they must be used under variable-speed constant-frequency power output conditions.

SUMMARY OF THE INVENTION

In view of the above-described problems, it is one objective of the invention to provide an AC brushless doubly-fed motor designed with a motor rotor winding in accordance with the principle that slot harmonics appear together with fundamental harmonics in winding MMF and opposite rotational direction.

To achieve the above objective, in accordance with one embodiment of the invention, there provided is an AC brushless doubly-fed motor comprising a stator 1 and a rotor 6, wherein the stator 1 comprises two sets of three-phase windings 3 and the number of pole pairs thereof is $p_1$ and $p_2$, respectively, the rotor 6 comprises a multi-phase wound winding 4 and phase number m is defined as $m=(p_1+p_2)/m_k$, wherein, when $p_1+p_2$ is odd, $m_k=1$; when $p_1+p_2$ is even, $m_k=2$; rotor slots 5 are evenly distributed along the circumference of an air gap 2 and the number of the rotor slots Z' is defined as $Z'=n(p_1+p_2)$, wherein n is a positive integer; rotor winding coils are a multi-turn structure, the coil number of each phase winding coil is $nm_k$ and each coil has the same span, but turn ratios among the coils are different; and when phase winding coil number is $\leq nm_k$, all coils within the phase winding will be automatically connected in short after being connected in series.

The motor rotor phase windings have the same number of coils and each coil has the same span. When the number of phase winding coils is $<nm_k$, all coils within the phase winding will be automatically connected in short after being connected in series.

The motor rotor phase winding comprises a backing coil with coil number $<nm_k$ and each coil has the same span. All coils adjacent to the slot number within the phase winding will be automatically connected in short after being connected in turn in series.

Sectional area of the motor rotor slot 5 is designed in accordance with equal conductor slot fill factor. When unequal turn coils or equal turn coils are used with coil number $<nm_k$, the rotor 6 will be an uneven slot form with varied sectional area.

The invention is based on winding slot harmonic MMF theory of AC motors. It should be noted that slot harmonic herein refers to slot harmonic MMF, created when an electrical current passes through the rotor winding. It is different from the harmonic formed by affecting air gap flux-density distribution by reluctance brushless doubly-fed motor rotor based on magnetic resistance change along the circumference of the rotor core. The principle of this invention is further explained below.

As to an actual AC motor, a winding coil is normally embedded in an iron-core groove. In this way, the winding coil conductor is not continuously distributed along the iron-core circumference according to ideal sine regulations. For a winding coil with symmetrical phase m arranged based on pole pair $p_1$ in accordance with AC motor winding theory, except the fundamental harmonic MMF with pole pair $p_1$, the slot harmonic MMF will also be created with $v=Z/p_1 \pm 1$, i.e. pole pair number $p_2=Z \pm p_1$.

This type of slot harmonic MMF has the following two characteristics:

1) Winding coefficient of the slot harmonic MMF is equal to that of the fundamental harmonic MMF.

The above statement is easy to be proved. Take integral slot winding as a example, as to with harmonics, normal winding coefficient is generally represented as $k_{dyv}=k_{dv}k_{yv}$, wherein $$k_{dv} = \frac{\sin v \frac{q\alpha}{2}}{q \sin \frac{v\alpha}{2}}$$

$$k_{yv} = \sin v \frac{y\pi}{2\tau}$$

In above two formulas, $\alpha=2p_1\pi/Z$, $\tau=Z/(2p_1)$, $q=Z/2mp_1$. y represents coil span expressed by slot numbers. Insert slot harmonic times $v=2mq\pm1$ into the above formulas:

$$k_{dv} = \frac{\sin v\frac{q\alpha}{2}}{q\sin\frac{v\alpha}{2}} = \frac{\sin(2mq\pm 1)\frac{q\alpha}{2}}{q\sin\frac{(2mq\pm 1)\alpha}{2}} = \frac{\sin\left(q\pi\pm\frac{q\alpha}{2}\right)}{q\sin\left(\pi\pm\frac{\alpha}{2}\right)} = \pm k_{d1}$$

$$k_{yv} = \sin v\frac{y\pi}{2\tau} = \sin(2mq\pm 1)\frac{y\pi}{2\tau} = \sin\left(y\pi\pm\frac{y\pi}{2\tau}\right) = \pm k_{y1}$$

We can obtain that $k_{dyv}=k_{d1}k_{y1}=k_{dy1}$, in which $k_{dy1}$ is the winding coefficient of corresponding fundamental harmonics. This formula indicates that the winding coefficient of the slot harmonic MMF is equal to that of the fundamental harmonic MMF.

2) The rotational direction of low-order slot harmonic MMF is opposite to that of the fundamental harmonic MMF.

Slot harmonics generally appear in pairs. For example, in first-order slot harmonic v=2mq±1, as pole pair number of the slot harmonic $p_2=Z-p_1$ in corresponding times v=2mq−1 is relatively less than pole pair number $p_2=Z+p_1$ in corresponding times v=2mq+1, therefore it is called the low-order slot harmonic. Next, we will take a three-phase symmetrical integral slot winding as an example to analyze rotational direction of its MMF.

As to harmonic MMF of a three-phase symmetrical winding, the harmonic MMF of each phase winding is as follows:

$$f_{Av} = F_{\phi v}\cos v\theta\cos\omega t$$

$$f_{Bv} = F_{\phi v}\cos v\left(\theta-\frac{2}{3}\pi\right)\cos\left(\omega t-\frac{2}{3}\pi\right)$$

$$f_{Cv} = F_{\phi v}\cos v\left(\theta-\frac{4}{3}\pi\right)\cos\left(\omega t-\frac{4}{3}\pi\right)$$

In above three formulas, when v=1, the total MMF of three-phase fundamental harmonics is $$f_1(t,\theta) = \frac{3}{2}F_{\phi 1}\cos(\omega t - \theta);$$

when v=2mq−1, the total MMF of three-phase slot harmonic is $$f_v(t,\theta) = \frac{3}{2}F_{\phi v}\cos(\omega t + (2mq-1)\theta).$$

It can be seen from the above two formulas that the rotational direction of the slot harmonic MMF with pole pair number $p_2=Z-p_1$ corresponding to v=2mq−1 is opposite to that of the fundamental harmonic MMF with pole pair number $p_1$. In the same way, we can prove that the rotational direction of the slot harmonic MMF with pole pair number $p_2=Z+p_1$ is the same as that of the fundamental harmonic MMF with pole pair number $p_1$.

The aforementioned two characteristics of the slot harmonic theory serve as the basis for rotor winding structure design of the invention.

According to the working principle of the brushless doubly-fed motor, the rotor winding is required to simultaneously create a rotating MMF with two sets of pole pair numbers $p_1$ and $p_2$, and the rotational direction of two types of MMF is opposite. On the basis of such requirements, the pole pair number $p_1$ of the required power winding has to be firstly confirmed, then control the pole pair number $p_2$ according to the selection, and finally select rotor slot number Z that meets the relation $p_2=Z-p_1$ based on the formula $P_2=Z-p_1$, i.e. meet symmetrical condition of rotor winding. As a result, it is possible for the rotor winding to meet symmetrical condition of both pole pair numbers $p_1$ and $p_2$, and simultaneously create a rotating MMF with opposite rotational direction. By now, the rotor winding phase number $m=Z/m_k=(p_1+p_2)/m_k$ (when Z is odd, $m_k=1$; when Z is even, $m_k=2$) and each phase winding coil number is $m_k$.

According to the above formula $p_1=Z-p_2$, it is not difficult to know that current pole pair number $p_1$ and $p_2$ are slot harmonics with one another. According to another principle that winding coefficient of the slot harmonic is equal to that of the fundamental harmonics, for rotor windings used for brushless doubly-fed motors, we only need to design a high winding coefficient depending on pole pair number $p_1$, then the high winding coefficient will be automatically obtained for another pole pair number $p_2$.

Although we can obtain the required rotor winding of slot harmonics in accordance with the above description, in MMF created by such rotor windings, apart from the slot harmonic with usable pole pair number $p_1$ and $p_2$, higher order slot harmonics also exist with frequency V=2 mkq±1 (k=1, 2, 3, . . . positive integer). The amplitude of such slot harmonics, especially lower order slot harmonics, will be much greater than slot harmonic MMF with pole pair number $p_1$ and $p_2$. Consequently, the performance of brushless doubly-fed motors will be severely affected. It is necessary to take every measure to weaken high-order slot harmonic to minimize the impact.

According to the Principle of Electric Machinery, it is an effective measure to weaken high-order slot harmonics by means of increasing rotor slots to enlarge rotor winding distribution effects. In order to ensure MMF symmetry of useful pole pair number $p_1$ and $p_2$, rotor slot number must be increased based on integral multiple of $Z=p_1+P_2$, i.e. new rotor slot number Z' should meet the relation $Z'=nZ=n(p_1+p_2)$(n=1, 2, 3, . . . positive integer), in which rotor winding phase $m=Z/m_k$ but coil number of each phase is $nm_k$. From above analysis, it is not difficult to conclude that all coils adjacent to all slot numbers within the phase winding shall be automatically connected in short after being connected in turn in series.

However, on the other hand, this kind of distribution effects will also inevitably weaken first-order useful slot harmonics. In order to ensure that brushless doubly-fed motors still have excellent performance, it is essential to take measures to make the first-order slot harmonics MMF amplitude produced by the rotor winding as large as possible while the other high-order harmonics MMF amplitude as small as possible.

It should be noted that if all rotor slots are still evenly distributed along the rotor circumference after slot number has been increased when coil span is the same, there always have some induced electromotive force produced by some coils in each rotor winding to be offset with one another. Therefore some part of the coils must be removed so as to ensure the rotor winding to create stronger first-order slot harmonic MMF. We should follow the principle (i.e. maintain maximum MMF amplitude with pole pair number $p_1$ and $p_2$ while maintain low content of the other high-order harmonics) and refer to winding MMF harmonic analysis results to decide which part of coils need to be removed.

A distinctive characteristic of the invention is to use multi-turn coils to form wound rotor windings. In this way, winding coil span can be changed flexibly and each coil may have different number of turns so as to weaken high-order harmonics to the maximum extent.

BRIEF DESCRIPTION OF THE DRAWINGS

FIG. 7 is a wound rotor winding connection diagram with unequal turn coils when $Z=54$, $p_1/p_2=4/2$, $y=7$ according to one embodiment of the invention;

FIG. 8 is a wound rotor winding connection diagram with a backing coil when $Z=54$, $p_1/p_2=4/2$, $y=7$ according to one embodiment of the invention.

DETAILED DESCRIPTION OF THE EMBODIMENTS

The invention is explained in further detail below with the aid of embodiments.

A brushless doubly-fed motor rotor with slot harmonics has pole pair number of power winding $p_1=4$ and control winding $p_2=2$. Select rotor slot number $Z=p_1+p_2=6$ according to the relation $Z=p_1+p_2$ and knows that rotor winding phase number $m=Z/m_k=6/2=3$ according to the relation $m=Z/m_k=(p_1+p_2)/m_k$ (when Z is odd, $m_k=1$; when Z is even, $m_k=2$).

Figure 1:
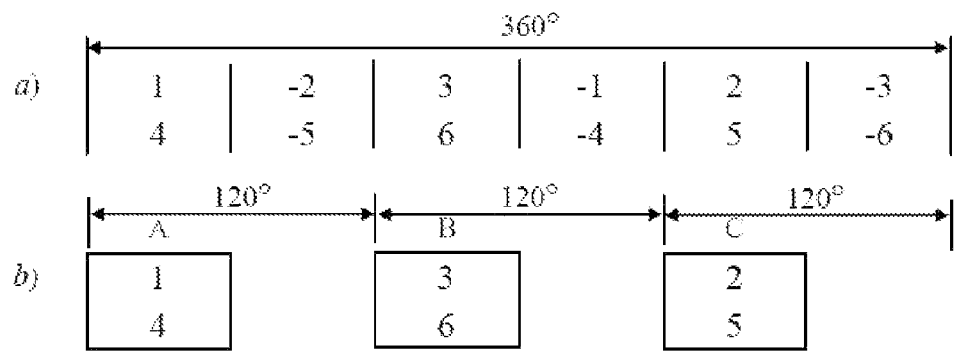
FIG. 1 is a slot number phase diagram when a) $Z=6$, $p_1=4$ and a three-phase slot number phase distribution diagram when b) $p_1=4$ according to one embodiment of the invention.
Figure 2:
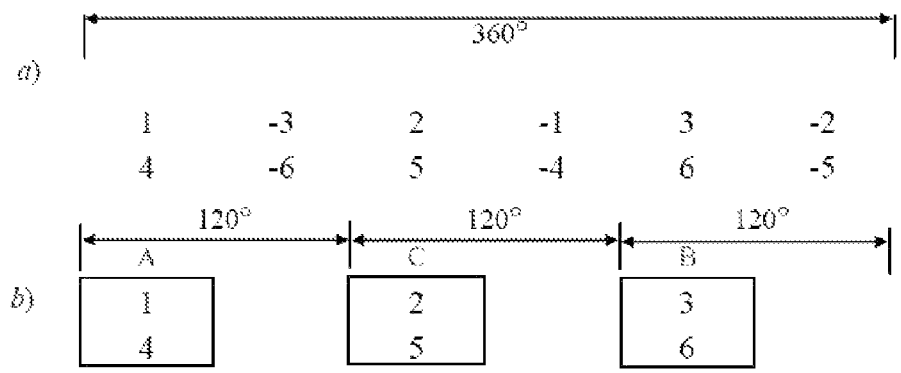
FIG. 2 is a slot number phase diagram when a) $Z=6$, $p_2=2$ and a three-phase slot number phase distribution diagram when b) $p_2=2$ according to one embodiment of the invention.

As to rotor winding of $Z=6$, $p_1=4$, $p_2=2$, $m=3$, if a specific connection mode is required, a slot number diagram can be drawn first as shown in FIG. 1a) so as to determine slot number distribution of each phase as shown in FIG. 1b). For three-phase windings when $p_1=4$, if coil span $y=1$, phase winding distribution coefficient is 1. Please refer to FIG. 2 for conditions when $p_2=2$. FIG. 2a) is a slot number phase diagram when $p_2=2$ and FIG. 2b) is a phase re-distribution diagram when $p_2=2$ based on three-phase slot number confirmed when $p_2=4$. It can be seen that it is also a three-phase windings when $p_2=2$ and phase winding distribution coefficient is also 1. This conforms to aforementioned slot harmonic theory.

Compare FIG. 1b) with FIG. 2b), we can see that phase sequence of A, B, C three-phase slot number distribution when $p_1=4$ and when $p_2=2$ is just opposite. This conforms to aforementioned working principle of the brushless doubly-fed motor rotor.

Figure 3:
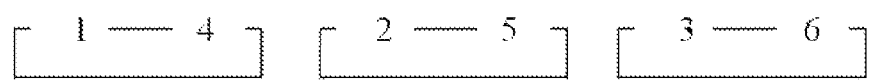
FIG. 3 is a three-phase wound rotor winding connection diagram when $Z=6$, $p_1/p_2=4/2$ according to one embodiment of the invention.

FIG. 3 shows specific connection method of a three-phase winding when $Z=6$, $p_1=4$ and $p_2=2$.

However, as noted earlier, if rotor windings are directly obtained according to the slot harmonic, as rotor slot number is too little, more high-order harmonics would exist to lead motor to produce high vibration and loud noise. It will be difficult in practical application. In order to solve such problem, more rotor slot numbers have to be used. According to the relation: $Z'=nZ=n(p_1+p_2)$, if $n=9$, the new rotor slot number $Z'=nZ=54$ and phase number of rotor winding is still $m=Z/m_k=3$, but coil number of each phase will be $nm_k=9\times2$.

Figure 4:
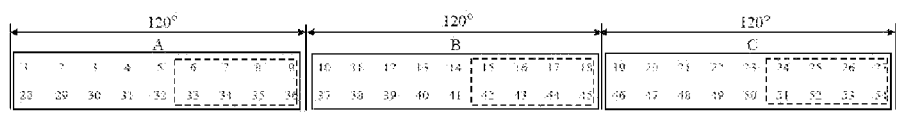
FIG. 4 is a three-phase slot number phase distribution diagram when $Z=54$, $p_2=2$ according to one embodiment of the invention.
Figure 5:
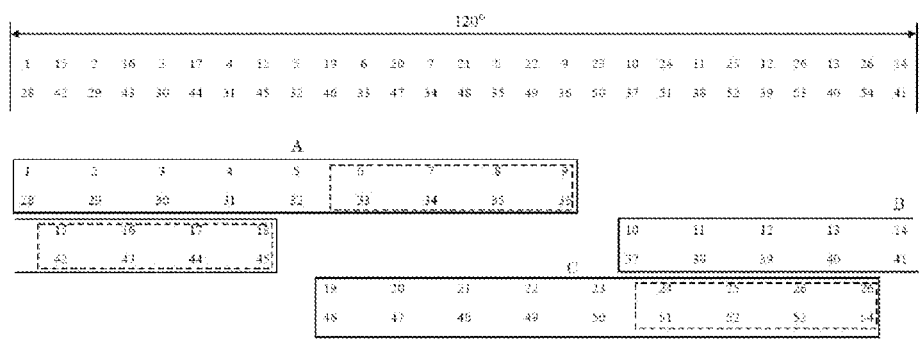
FIG. 5 is a slot number phase diagram and three-phase slot number phase distribution diagram when $Z=54$, $p_1=4$ according to one embodiment of the invention.

Increasing rotor slot number is an effective way to weaken high-order harmonics in rotor winding MMF, but required fundamental harmonics will also be inevitably weakened. FIGS. 4 and 5 show a three-phase coil slot number phase distribution when rotor slot number $Z=54$ and pole pair number $p_2=2$ and $p_1=4$. It can be seen that rotor winding phase belt width is 120° (electrical angle) to $p_2=2$ and 240° to $p_1=4$. Winding distribution coefficient decreases considerably compare with $Z=6$ before slot number is increased. In order to make an improvement, it can be considered to remove some slot numbers of phase belt margin. For example, remove slot numbers in dotted box as shown in FIGS. 4 and 5, then phase belt width becomes 67° (electrical angle) to $p_2=2$ and 133° to $p_1=4$. Winding distribution coefficient has been largely increased. If suitable coil span is selected, high-order harmonics will also be decreased dramatically. Specific connection method for new winding coils is that all coils adjacent to the slot number within each phase winding will be automatically connected in short after being connected in turn in series as shown in FIG. 6.

Figure 6:
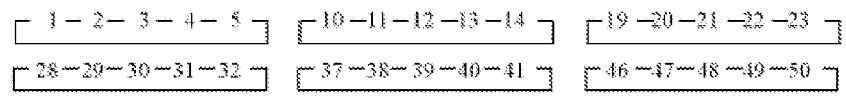
FIG. 6 is a wound rotor winding connection diagram with some coils removed when $Z=54$, $p_1/p_2=4/2$ according to one embodiment of the invention.
Figure 9:
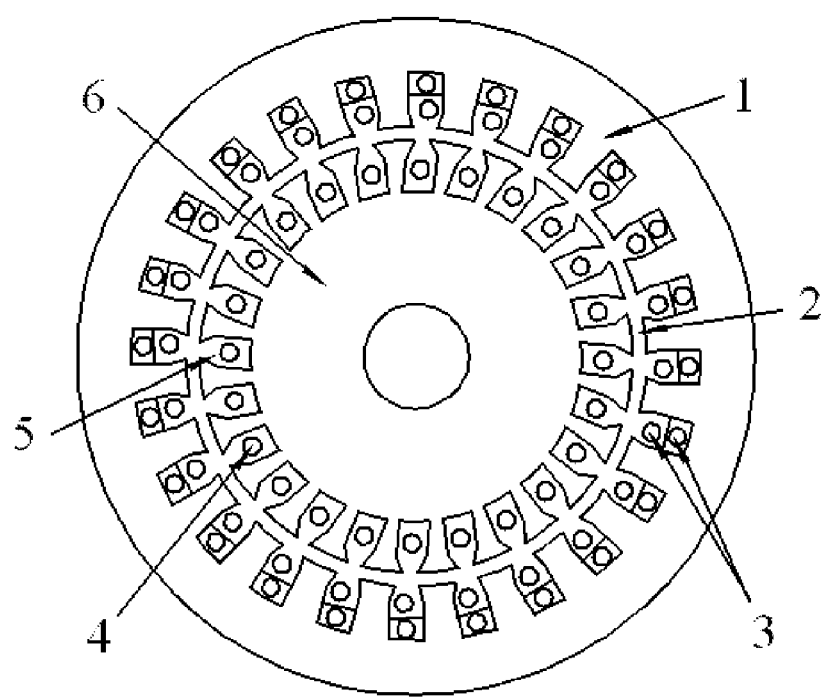
FIG. 9 is an illustration of a brushless doubly-fed motor according to one embodiment of the invention.

The rotor winding shown in FIG. 6 has a higher winding coefficient and lower high-order harmonic content. But the conductor has low utilization ratio as more slot numbers are removed. In order to improve conductor utilization ratio and further reduce winding MMF harmonic content, unequal turn coils may be taken into account since winding coils in this invention are multi-turn structure. FIG. 7 shows a connection method of the rotor winding with unequal turn coils adopted and the marked slot number represents relative turn ratio.

Removing some coils or using unequal turn coils may cause unequal rotor slot fill factor. In order to solve such problem, rotor slot can be designed with varied sectional area according to equal slot fill factor.

Another characteristic of wound rotor windings according to the invention is that coils can be connected flexibly based on actual conditions. FIG. 8 shows a rotor winding connection method with a backing coil when $Z=54$, $p_1/p_2=4/2$ and $y=7$ with lower harmonic content and a higher winding coefficient, i.e. 0.9092 when $p_1=4$ and winding coefficient is 0.4546 when $p_2=2$.

The invention claimed is:

1. A wound rotor brushless doubly-fed motor for connecting to a power grid power supply and a variable-frequency power supply, the wound rotor brushless doubly-fed motor comprising:
   an air gap having a circumference;
   a stator comprising a first set of three-phase windings and a second set of three-phase windings, each winding having pole pairs, wherein there are $p_1$ in number of pole pairs in the first set of the three-phase windings and there are $p_2$ in number of pole pairs in the second set of the three-phase windings; and
   a rotor comprising a plurality of slots evenly distributed along the circumference, a number of the plurality of slots being Z'; and one set of multi-phase windings having a plurality of phases, a number of the plurality of phases being m, and having a plurality of winding coils in each phase, each of the plurality of winding coils having an equal span;
   wherein:
   Z' equals to $n(p_1+p_2)$, wherein n is a positive integer and n is equal to or greater than two;
   the first set of the three-phase windings is adapted to be connected to the power grid power supply and to receive current from the power grid power supply;

the second set of the three-phase windings is adapted to be connected to the variable-frequency power supply and to receive current from the variable-frequency power supply;

the rotor is adapted to induce a first rotating MMF and a second rotating MMF in response to the current from the power grid power supply and the current from the variable-frequency power supply, respectively, and rotating direction of the first rotating MMF and rotating direction of the second rotating MMF are opposite to each other;

when in use, the rotational speed of the wound rotor brushless doubly-fed motor is variable in response to the variation of the frequency of the variable-frequency power supply;

the plurality of winding coils in each phase of the one set of multi-phase windings is disposed in the plurality of slots, and a number of the plurality of winding coils in each of the plurality of slots is zero or one;

when $p_1+p_2$ is odd, m equals to $p_1+p_2$, and a number of the plurality of winding coils in each phase of the one set of multi-phase windings is equal to or smaller than n; and when $p_1+p_2$ is even, m equals to $(p_1+p_2)/2$, and a number of the plurality of winding coils in each phase of the one set of multi-phase windings is equal to or smaller than 2n.

2. The motor of claim 1, wherein each of the plurality of winding coils in each phase of the one set of multi-phase windings has an equal number of coil turns.

3. The motor of claim 1, wherein each of the plurality of slots has an equal number of a slot fill factor.

4. The motor of claim 1, wherein:
the plurality of winding coils in each phase of the multi-phase winding comprises a first group of winding coils and a second group of winding coils; and
the first group of winding coils is connected in series and the second group of winding coils is connected in series whereby two closed-loop circuits are formed in each phase of the multi-phase winding.

5. The motor of claim 1, wherein none of the plurality of winding coils in each phase of the one set of multi-phase windings is disposed in each of at least one of the plurality of slots.

6. In a wound rotor brushless doubly-fed motor for connecting to a power grid power supply and a variable-frequency power supply, the wound rotor brushless doubly-fed motor comprising a three-phase power winding having $p_1$ pole pairs, a three-phase control winding having $p_2$ pole pairs, and a multi-phase winding having a plurality of phases and having a plurality of winding coils in each phase, a number of the plurality of phases being m, the multi-phase winding being disposed in a plurality of slots, and a number of the plurality of slots being Z'; the improvement comprising that:
a) $Z'=n(p_1+p_2)$, n is a positive integer and n is equal to or greater than two;
b) when $p_1+p_2$ is odd, m equals to $p_1+p_2$, when $p_1+p_2$ is even, m equals to $(p_1+p_2)/2$;
c) the first set of the three-phase windings is adapted to be connected to the power grid power supply and to receive current from the power grid power supply;
d) the second set of the three-phase windings is adapted to be connected to the variable-frequency power supply and to receive current from the variable-frequency power supply;
e) the rotor is adapted to induce a first rotating MMF and a second rotating MMF in response to the current from the power grid power supply and the current from the variable-frequency power supply, respectively, and rotating direction of the first rotating MMF and rotating direction of the second rotating MMF are opposite to each other;
f) when in use, the rotational speed of the wound rotor brushless doubly-fed motor is variable in response to the variation of the frequency of the variable-frequency power supply;
g) the plurality of winding coils in each phase of the multi-phase winding is disposed in the plurality of slots, and a number of the plurality of winding coils in each of the plurality of slots is zero or one; and
h) when $p_1+p_2$ is odd, a number of the plurality of winding coils in each phase of the multi-phase winding is equal to or smaller than n; and when $p_1+p_2$ is even, a number of the plurality of winding coils in each phase of the multi-phase winding is equal to or smaller than 2n.

7. The motor of claim 6, wherein none of the plurality of winding coils in each phase of the one set of multi-phase windings is disposed in each of at least one of the plurality of slots.

8. A wound rotor brushless doubly-fed motor for connecting to a power grid power supply and a variable-frequency power supply, the wound rotor brushless doubly-fed motor comprising:
an air gap having a circumference;
a stator comprising a first set of three-phase windings and a second set of three-phase windings, each winding having pole pairs, there being 4 pole pairs in the first set, and there being 2 pole pairs in the second set; and
a rotor comprising a plurality of slots evenly distributed along the circumference; and one set of multi-phase windings having a plurality of phases and having a plurality of winding coils in each phase, each of the plurality of winding coils having an equal span;
wherein:
a number of the plurality of slots is 54;
a number of the plurality of phases of the one set of multi-phase windings is 3;
the first set of the three-phase windings is adapted to be connected to the power grid power supply and to receive current from the power grid power supply;
the second set of the three-phase windings is adapted to be connected to the variable-frequency power supply and to receive current from the variable-frequency power supply;
the rotor is adapted to induce a first rotating MMF and a second rotating MMF in response to the current from the power grid power supply and the current from the variable-frequency power supply, respectively, and rotating direction of the first rotating MMF and rotating direction of the second rotating MMF are opposite to each other;
when in use, the rotational speed of the wound rotor brushless doubly-fed motor is variable in response to the variation of the frequency of the variable-frequency power supply;
none of the plurality of winding coils is disposed in 8 of the 18 slots in each phase of the one set of multi-phase windings; and
one of the plurality of winding coils is disposed in each of the remaining 10 slots in each phase of the one set of multi-phase windings.

* * * * *